United States Patent [19]

Wanger

[11] 4,137,707
[45] Feb. 6, 1979

[54] INTEGRATED CONTROL SYSTEM FOR A GAS TURBINE ENGINE

[75] Inventor: Robert P. Wanger, Fairfield, Ohio

[73] Assignee: General Electric Company, Cincinnati, Ohio

[21] Appl. No.: 818,256

[22] Filed: Jul. 22, 1977

[51] Int. Cl.² ............................................. F02C 9/08
[52] U.S. Cl. .................................. 60/39.28 R; 60/223
[58] Field of Search ......................... 60/39.28 R, 223

[56] References Cited

U.S. PATENT DOCUMENTS

| 3,232,053 | 2/1966 | Rogers et al. | 60/39.28 R |
|---|---|---|---|
| 3,820,323 | 6/1974 | Burnell et al. | 60/39.28 R |
| 3,834,361 | 9/1974 | Keely | 60/39.28 R |

Primary Examiner—Robert E. Garrett
Attorney, Agent, or Firm—Henry J. Policinski; Derek P. Lawrence

[57] ABSTRACT

An integrated control system for use with a gas turbine engine is provided wherein the control system includes a fuel control valve adapted to meter the flow of fuel to the engine, variable geometry control valve to control compressor variable stators or bleed, back-up control means for providing signals to the control valves and primary control means for providing bias of the signals. Means are provided for biasing the signals during normal mode of operation and the means may be ineffective to bias the signals during failed mode of operation.

17 Claims, 3 Drawing Figures

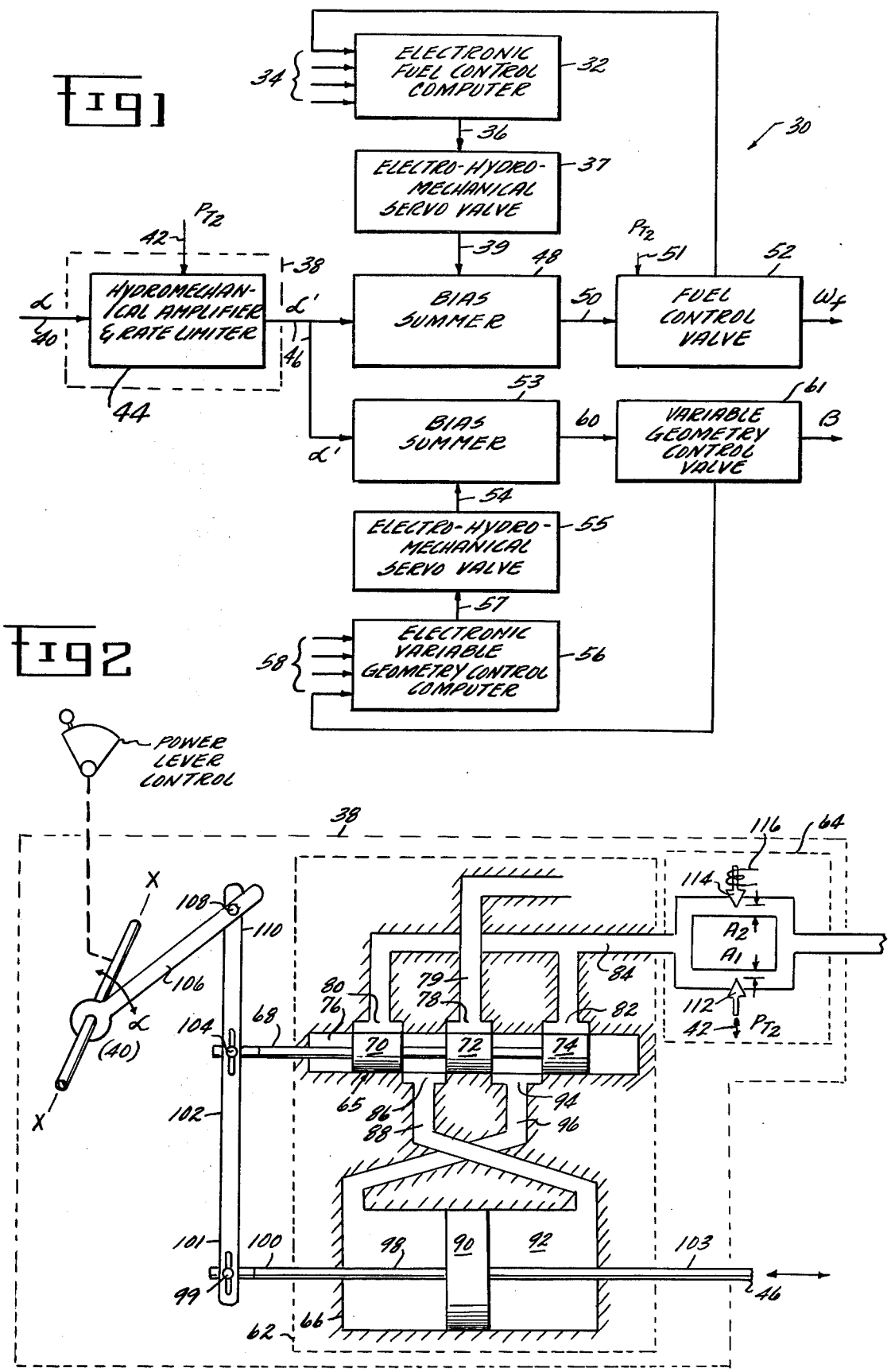

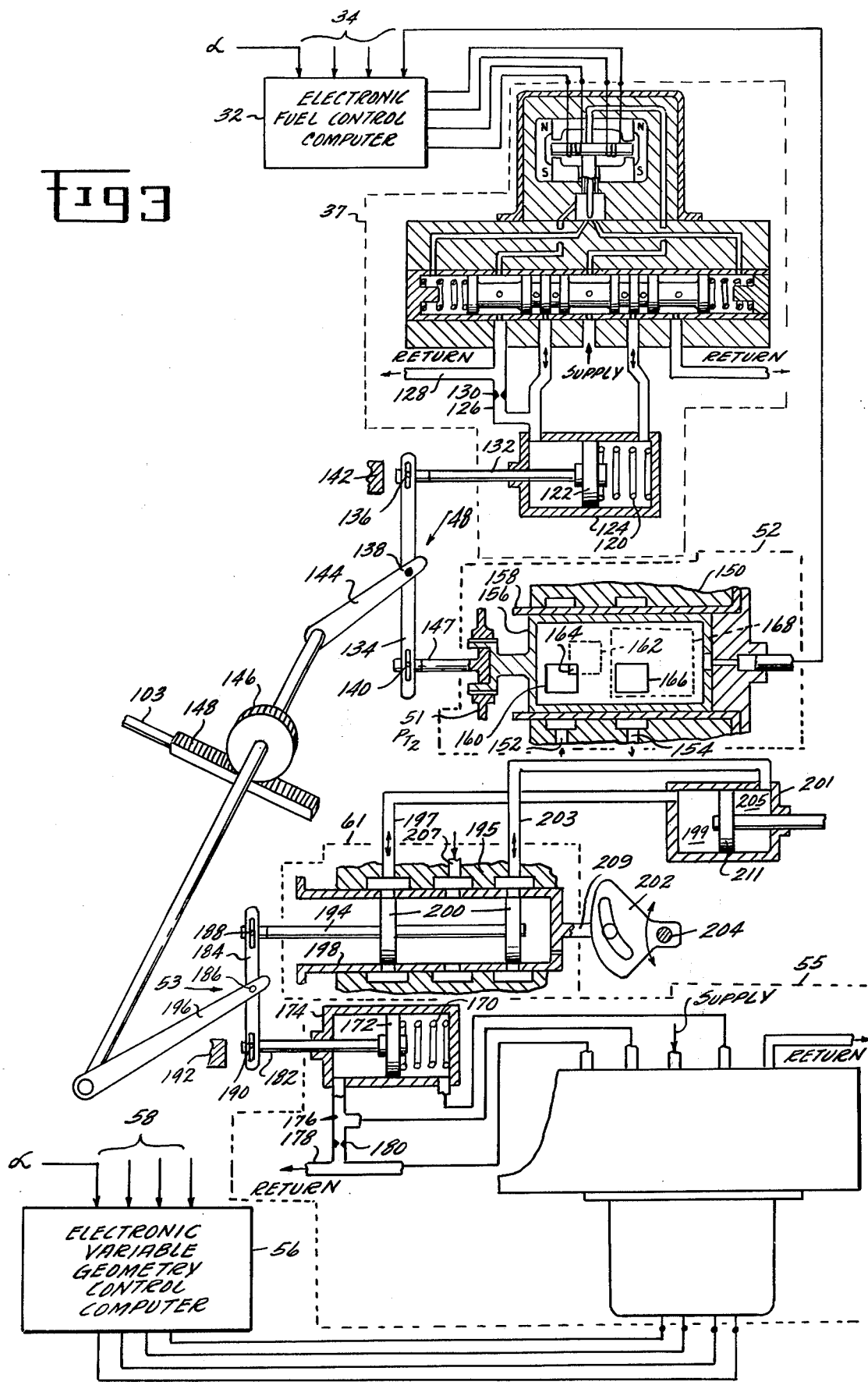

INTEGRATED CONTROL SYSTEM FOR A GAS TURBINE ENGINE

BACKGROUND OF THE INVENTION

This invention relates to a control system for a gas turbine engine and, more particularly, to an integrated control system including a primary control and a back-up control, the latter being adapted to provide continued operation of the gas turbine engine in the event of malfunction or failure of the primary engine control system.

Full authority electronic control systems for gas turbine engines provide a number of significant advantages over conventional hydromechanical control systems. However, since full authority electronic control systems are only advancing to what might be termed a first generation level, confidence in the reliability of such electronic controls has not attained the level generally associated with the hydromechanical systems which have been in use for many years in highly refined configurations. Consequently, it is advisable to complement the electronic control system with a secondary or back-up hydromechanical control system which will assure continued operation of the engine in the event the primary electrical control system exhibits a malfunction or a failure.

In a gas turbine control system having back-up capability, it is necessary to have compatibility between the primary electronic control system and the back-up hydromechanical control. In other words, the back-up system must not interfere with the primary system when the latter is in control of the engine and vice versa. Prior art control systems have approached the compatibility requirement by rendering the back-up control entirely inoperative while the engine is under the control of the primary control system. Transfer from one control system to the other is accomplished either by a manual switch operated by the operator or by automatic means. In either case, however, a period of time is encountered wherein uncontrolled transients may be introduced into the control of the engine as the primary system relinquishes control of the engine and the back-up system assumes such control. Additionally, it is usual practice to design the primary control and the back-up control upon different control theory whereby switching from one system to the other may result in step-type changes causing an immediate alteration in the operation of the engine. Transients and step-type changes in engine operation may require immediate operator attention and are therefore undesirable.

Another problem exhibited by prior art control systems having primary and back-up capability is associated with inactivity of the back-up system while the primary control is in operation. Since extended periods of time, usually years, may pass while the primary control is fully operable, the back-up system may deteriorate, unknownst to the engine operators, to a condition wherein it will not function properly when called upon in the event the primary system fails.

SUMMARY OF THE INVENTION

Therefore, it is an object of the present invention to provide an integrated control system for a gas turbine engine.

It is another object of the present invention to provide an integrated control system wherein a primary electronic control system is entirely compatible with a back-up mechanical control system and wherein both primary and back-up control systems are operable in controlling the engine in a first normal mode of operation and wherein the back-up control system is effective to control the engine when the primary control system is in a second failed mode of operation.

It is yet another object of the present invention to provide an integrated control system wherein, upon failure of the primary electronic control system, transfer of control of the engine is accomplished in a controlled and orderly manner.

Briefly stated, these and other objectives, as well as advantages, which will become apparent hereinafter, are accomplished by the present invention which, in one form, provides an integrated control system for use with a gas turbine engine wherein the system includes a fuel control valve adapted to meter the flow of fuel to the gas turbine engine, variable geometry control valve to control such engine variable geometry's compressor variable stators or bleed, back-up control means for providing signals to said control valves and primary control means for providing bias of said signals. Means are also provided for biasing the signals during a first normal mode of operation wherein the primary control means are in an operative condition. The means may be made ineffective to bias the signal during a second failed mode of operation wherein the primary control means is in an inoperative condition. Means may also be included for increasing the flow of fuel to the engine in response to malfunction of said primary control means and limiting means may be employed for limiting the increase in fuel flow to a predetermined magnitude and for limiting the range of travel of the engine variable geometry.

DESCRIPTION OF THE DRAWINGS

While the specification concludes with claims distinctly claiming and particularly pointing out the invention described herein, the invention is more readily understood by reference to the discussion below and the accompanying drawings in which FIG. 1 is a block diagram of the integrated control system comprising the present invention;

FIG. 2 is a schematic view of the hydromechanical amplifier and rate limiter depicted in FIG. 1; and FIG. 3 is a schematic view of a portion of the integrated control system depicted in FIG. 1.

DESCRIPTION OF THE PREFERRED EMBODIMENT

Referring to FIG. 1, a simplified block diagram representation of the integrated control system according to the present invention is presented and depicted generally at 30. Control system 30 includes primary control means in the form of electronic fuel control computer 32 receiving a number of input signals 34, which may be representative of ambient conditions, selected engine operating parameters and power level angle set by the engine operator. Typical parameters may include fan inlet pressure, fan inlet temperature, fan speed, core engine speed, compressor discharge temperature, compressor discharge pressure, turbine inlet temperature, turbine discharge temperature and fuel flow, each of which may be utilized by computer 32 in providing a first electrical bias signal 36 to electrohydromechanical servovalve 37 which in turn supplies a mechanical bias signal 39 to bias summer 48.

It is believed that a presentation of the specific design of electronic fuel control computer 32 is not necessary for an understanding of the present invention. Generally, however, computer 32 receives input signals 34 representative of power level angle and ambient conditions from which the engine speed or thrust required by the engine operator may be determined. Computer 32 also receives other input signals 34 which are representative of actual operating parameters or conditions of the engine such as actual fan speed, actual core engine speed, compressor discharge temperature and pressure, turbine operating temperature and fuel flow to the engine. By way of comparing the actual operating parameters of the engine with reference values set as a function of power level angle and ambient conditions, computer 32 senses whether or not the engine is operating at the thrust or engine speed required by the engine operator and, if not, determines the deviation of the engine from the required speed or thrust. Accordingly, computer 32 provides a first electrical bias signal 36 to electro-hydromechanical servovalve 37 for the purpose of metering fuel flow to the engine at acceptable flow rates whereby it operates at the required thrust or speed set by the engine operator. Additionally, computer 32 senses deviations in engine acceleration or deceleration and provides bias signal 36 for maintaining acceptable rates of change of engine speed.

Control speed 30 includes secondary or back-up control means, depicted for purposes of description as back-up mechanical control 38, operable to control engine fuel flow and the position of variable elements of the engine in response to the power lever positions set by the engine operator to achieve a certain level of thrust or speed and in response to pressure signal 42 ($P_{T_2}$) indicative of the magnitude of total pressure existing at the inlet of the gas turbine inlet. Mechanical position signal 40 or $\alpha$, indicative of the desired percent of maximum possible thrust, is generated by appropriate linkage in accordance with the throttle setting selected by the engine operator.

Signals 40 and 42 are received by hydromechanical amplifier and rate limiter 44 which amplifies signal 40 and further limits, in response to pressure signal 42, the rate at which a change in position signal 40 is transmitted to fuel control valve 52. The rate limiter is provided since the acceleration capability of the engine is limited and hence the rate of change in fuel flow to the engine must be within certain limits to avoid engine stall or overtemperature. Therefore, in the event the operator modifies the power lever position thereby changing the magnitude of position signal 40 ($\alpha$), element 44 limits the rate at which the change in signal 40 is passed, as signal 46 ($\alpha'$), to the fuel control valve 52 of the engine. As will further be explained, at low altitudes element 44 permits more rapid transmission of changes in signal 40 than at higher altitudes where permissible maximum acceleration limits are lower. This feature of the invention will be more fully explained with reference to FIG. 2.

First biasing means in the form of bias summer 48 receives output signal 39 and mechanical output signal 46 and provides a fuel metering signal 50 to fuel control valve 52 which also receives engine inlet total pressure signal 51 ($P_{T_2}$). The fuel control valve 52 schedules fuel to the gas turbine engine at a specified flow rate Wf in response to signals 51 and 50. Generally, bias summer 48 is adapted to provide metering signal 50 in response to mechanical bias signal 39 and mechanical output signal 46 when primary electronic fuel control computer 32 is functioning properly. In the event of a malfunction of computer 32 or other elements associated with it, bias summer 48 is adapted to provide metering signal 50 only in response to mechanical output signal 46 received from back-up control 38 in a manner hereinafter to be explained.

Second biasing means in the form of second bias summer 53 also receives mechanical output signal 46 and a second variable geometry mechanical bias signal 54 which is provided by electro-hydromechanical servovalve 55 in response to electrical bias signal 57 received from electronic variable geometry control computer 56. Computer 56 receives a number of input signals 58 each representative of a selected engine operating parameter and useful in setting the position of movable components in the gas turbine engine, such as variable stators in the compressor section of the engine or variable nozzles associated with the exhaust portion of the gas turbine engine. Bias summer 53 is adapted to operate in a manner similar to the operation of bias summer 48. When computer 56 is functioning properly, bias summer 53 provides a variable geometry position signal 60 to variable geometry control 61 in response to mechanical bias signal 54 provided by computer 56 and in response to mechanical signal 46. In the event of a malfunction of computer 56 or engine components associated with it, bias summer 53 is adapted to provide variable geometry control signal 60 in response to mechanical signal 46 associated with back-up control 38. Control 61 schedules the variable elements of the gas turbine engine at the appropriate position $\beta$.

Referring now to FIGS. 2 and 3, a schematic respresentation of integrated control 30 is presented in greater than depicted in FIG. 1. Back-up control 38 generally includes a hydraulic amplifier 62 and a rate limiter 64. Amplifier 62 is shown to be comprised of a conventional design wherein a spool-valve type servo unit 65 is in fluid communication with a power piston unit 66. More specifically, servo unit is comprised of an elongated rod 68 having a plurality of increased diameter spaced apart lands 70, 72 and 74 disposed generally at one end thereof. Lands 70, 72, 74 reside in a fluid chamber 76 having a fluid inlet port 78 connected to a source of hydraulic fluid under pressure through fluid supply conduit 79 and a pair of outlet ports 80 and 82 in fluid communication with a sump (not shown) through sump conduit 84. Additionally, port 86 provides fluid communication via conduit 88 between fluid chamber 76 and one side of power piston 90 disposed translatably within a fluid chamber 92 in power piston unit 66. Port 94 provides fluid communication via conduit 96 between fluid chamber 76 and a second side of power piston 90. Power piston 90 is fixedly secured to an elongated shaft 98 extending through unit 66. One end 100 of shaft 98 is pivotally secured at pivot 99 to one end 101 of power input lever linkage member 102. The other end 103 of shaft 98 is adapted to provide mechanical position signal 46 to bias summers 48 and 53. Linkage member 102 is further pivotally secured at intermediate pivot 104 to elongated rod 68 of servo unit 65 and to a power level input link 106 at pivot 108 disposed at end 110 of linkage member 102. Input link 106 is adapted to rotate about an axis X—X in response to changes in the power lever setting and the angular position $\alpha$ of link 106 establishes signal 40.

Proceeding with a description of the operation of amplifier 62, as viewed in FIG. 2, amplifier 62 is depicted in its steady-state position; that is to say, in the position occupied when the engine is operating in a steady-state position. In the steady-state position, lands 70, 72 and 74 overlap and block ports 80, 78 and 82 respectively. Hence chamber 76 is isolated from fluid communication with fluid supply conduit 79 and sump conduit 84. In the event the engine operator desires to change the output of the gas turbine engine, he moves the position of the power lever which in turn changes the angular position of link 106, thus requiring a change in fuel flow to the engine. By way of example, if increased thrust or fuel flow were desired, link 106 would rotate clockwise as viewed in FIG. 2. Since outlet ports 80 and 82 are blocked in the steady-state position, piston 90 is hydraulically locked in place and linkage member 102 is caused to rotate about pivot 99. Rotation of member 102 in the clockwise direction pushes elongated rod 68 to the right, as viewed in FIG. 2, thus establishing fluid communication between ports 78 and 86 whereby pressurized fluid is delivered to the right side of power piston 90. Simultaneously, communication is established between outlet port 82 and port 94 whereby fluid to the left of piston 90 may be returned to sump. Hence, fluid under pressure on the right side of piston 90 moves piston 90 to the left displacing fluid to the left of piston 90 to sump and modifying fuel flow to the engine and the position of the variable elements in the engine. Movement of piston 90 pivots linkage member 102 clockwise about pivot point 108 and such movement translates elongated rod 68 leftward until once again lands 72 and 74 block ports 78 and 82 respectively whereupon the system is again in a steady-state condition but with the gas turbine engine operating at an increased thrust output. The degree of change in the angular position of link 106 determines the magnitude of travel of rod 68, the magnitude of travel of piston 90 and hence the magnitude of thrust increase. Additionally, a decrease in engine thrust may be accomplished by rotating link 106 counterclockwise whereupon rod 68 translates to the left causing piston 90 to translate to the right.

Rate limiter 64 is provided in order to avoid engine stall during engine acceleration by limiting the rate of change of fuel flow to the gas turbine engine in response to the engine inlet pressure ($P_{T_2}$). Limiting the rate of change of fuel flow is accomplished by limiting the rate at which a change in power level angle is received by fuel control valve 52 or, in other words, the rate at which a signal indicative of the magnitude of a desired change in fuel flow is received by valve 52. As depicted in FIG. 2, a pair of variable restrictors 112 and 114 are disposed in sump conduit 84 for the purpose of selectively restricting the flow of servo unit hydraulic fluid from the low pressure side of piston 90 under transient operation. Since electronic computer 32 has the capability of monitoring and controlling the rate at which increases in the fuel flow are transmitted to the gas turbine engine, restrictor 114 is normally fully open when computer 32 is operating correctly such that Area $A_2$ is very large and thus rate limiter 64 is essentially ineffective to substantially delay transmission of a change in power level angle. Hence, under normal conditions, delay is accomplished by electronic computer 32. However, in the event of malfunction of computer 32, solenoid 116 closes restrictor 114 such that Area $A_2$ is essentially zero. Under these conditions rate limiter is effective to limit the rate of change of fuel flow to the engine. More specifically, when the angular position of link 106 is modified, thereby signaling a desired change in the magnitude of fuel flow to the gas turbine engine, rate limiter 64 limits the rate at which servo unit hydraulic fluid drains from the low pressure side of piston 90. This in turn limits the rate at which piston 90 translates in chamber 92 and hence limits the rate at which the change in magnitude of fuel flow is accomplished. Variable restrictor (112) modifies variable flow area $A_1$ proportionally with respect to engine inlet pressure $P_{T_2}$. When $P_{T_2}$ is low, as encountered at high altitude, $A_1$ is small. Under this latter condition, the flow of fluid from the low pressure side of piston 90 is restricted and hence piston 90 translates at a slower rate causing a slow rate of change of fuel flow to the gas turbine engine.

Drawing attention specifically to FIG. 3 which shows a more detailed schematic representation of a portion of the integrated control system, electro-hydromechanical servovalve 37 is substantially comprised of a device shown in U.S. Pat. No. 3,922,955, incorporated herein by reference, which may be referred to for a detailed description of the operation of the device. However, servovalve 37 shown in FIG. 3 differs from the device depicted in the referenced patent in the following respects. First, the servovalve 37 includes spring 120, disposed on the head side of power piston 122 in power unit 124, and secondly, the servovalve 37 includes restricted conduit 126 providing fluid communication between the rod side of piston 122 in power unit 124 and return line 128 communicated with a fluid sump (not shown). A restrictor 130 controls the rate at which fluid bleeds from the rod side of piston 122 to the sump return line 128. As set forth in the above-referenced patent the electro-hydromechanical servovalve shown therein is fail-fixed; that is to say, if the electronic computer 32 fails the piston 122 remains momentarily hydraulically locked in the position it occupied at the time of failure. However, with the spring 120 and restrictor 130 disposed in the servovalve 37 as shown in FIG. 3, the piston 122, in the event of failure of computer 32, will drift slowly to the left in a controlled manner for purposes hereinafter to be explained.

The position of rod 132 of power unit 124 provides mechanical bias signal 39 to bias summer 48. As viewed in FIG. 3, movement of piston 122 to the right will effect a decrease in fuel flow to the gas turbine engine, whereas movement of piston 122 to the left will effect an increase in fuel flow to the engine.

Bias summer 48 is comprised of elongated linkage member 134 having upper, intermediate and lower slotted pivot connections 136, 138 and 140 respectively. Summer 48 further includes a stop 142 which limits leftward movement of piston rod 132 to a predetermined distance.

Rod 132 of power unit 120 is pivotally secured to linkage member 134 at pivot connection 136. Linkage member 134 is also pivotally secured at intermediate pivot connection 138 to arm 144 which in turn is affixed to, and rotatable with, pinion 146 adapted to engage rack 148. Movement of rack 148 effects rotation of pinion 146 and arm 144. Lower pivot connection 140 secures linkage member 134 to shaft 147 the position of which provides fuel metering signal 50 received by fuel control valve 52.

Fuel control valve 52 is depicted schematically as a multiplying fuel valve wherein the fuel exiting the valve is a function of both fuel metering signal 50 and inlet total pressure signal 51 ($P_{T_2}$). Generally, valve 52 may be comprised of a housing 150, having fluid inlet and outlet ports 152 and 154 respectively, and a pair of concentric, cylindrical, hollow, inner and outer cylinders 156 and 158, respectively, which are in sliding engagement, one within the other. Cylinders 156 and 158 have partially overlapping inlet and outlet windows 160 and 162, respectively, within their respective cylinder walls whereby fuel, entering housing 150, is communicated to the interior of cylinder 156 through the overlapped portion 164 of windows 160 and 162. The area of overlapped portion 164 is variable in accordance with translation and rotation of cylinder 156 within cylinder 158. The larger the area of overlapped portion 164 the greater the flow of fuel to the gas turbine engine because additional valves and pressure sensing means, not shown, maintain a nominally constant pressure drop across the overlapped portion 164. Cylinders 156 and 158 further include overlapping outlet windows 166 and 168, respectively, whereby fuel may pass from the interior of cylinder 156 to fluid outlet 154 and thence to the combustor of the gas turbine engine.

Inner cylinder 156, adapted for translation within cylinder 158 in response to metering signal 50, is further adapted for rotation in accordance with inlet total pressure signal 51 ($P_{T_2}$). Both translation and rotation of cylinder 156 with respect to cylinder 158 effect variation in the area of overlapped portion 164 of windows 160 and 162. Translation of cylinder 156 to the right increases the area of overlap and hence permits increased fuel flow to the engine, while translation of cylinder 156 to the left decreases the area of overlap and decreases fuel flow to the engine. Rotation of cylinder 156 in a clockwise direction (as viewed by an observer standing to the left of fuel control valve 52) also increases the area of overlap and increases the flow of fuel to the engine, while rotation of cylinder 156 in the counterclockwise direction reduces the area of overlap and results in a decrease in fuel flow to the engine.

Electro-hydromechanical servovalve 55 is substantially identical to servovalve 37 and hence its general operation and design may also be understood by a reading of the above-referenced patent. Servovalve 55 includes spring 170 disposed on the head side of power piston 172 in power unit 174. Furthermore, servovalve 55 includes conduit 176 providing fluid communication between the rod side of piston 172 in power unit 174 and return line 178 communicated with a fluid sump (not shown). Restrictor 180 controls the rate at which fluid bleeds from the rod side of piston 172 to the sump return line 178. In the event of failure of electronic computer 56, spring 170 and restrictor 180 permit piston 172 to drift slowly to the left in a controlled manner for purposes hereinafter to be explained.

The position of rod 182 of power unit 174 provides a mechanical bias signal 54 to bias summer 53. As viewed in FIG. 3, movement of piston 172 to the right will effect appropriate changes in the position of the variable components of the gas turbine engine, such as the variable compressor stator vanes or variable nozzles, to accommodate reduced engine thrust or speed. Conversely, movement of piston 172 to the left will reposition such variable components to accommodate increased engine thrust or speed.

Bias summer 53 is comprised of elongated linkage member 184 having upper, intermediate and lower pivot connections 188, 186 and 190 respectively. Summer 53 further includes a stop 192 which limits leftward movement of piston rod 182 to a predetermined distance.

Rod 182 of power unit 174 is pivotally secured to linkage member 184 at pivot connection 190. Linkage member 184 is also pivotally secured at upper pivot connection 188 to shaft 194 the position of which is indicative of variable geometry control signal 60. Intermediate connection 186 secures linkage member 184 to arm 196 which in turn is affixed to pinion 146.

Variable geometry control valve 61 is depicted schematically as including a housing 195 and a multi-ported movable cylinder 198, disposed in housing 195, in which a pair of piston lands 200, affixed to shaft 194, are disposed for reciprocal movement therein. One land 200 is adapted to be selectively disposed over a fluid outlet conduit 197 providing for selective fluid communication with the piston side 199 of variable geometry power unit 201, while the other land 200 is adapted to be selectively disposed over a fluid outlet conduit 203 providing for selective fluid communication with the rod side 205 of power unit 201. Fluid supply conduit 207, connected to a source (not shown) of fluid under pressure, is adapted to provide fluid under pressure to movable cylinder 198 at a site intermediate the pair of piston lands 200. Movable cylinder 198 is secured to shaft 209 which is adapted for reciprocal movement through engagement with feedback cam 202 rotatable about pivot 204. Feedback cam 202 is rotatable in accordance with the position of the variable components of the gas turbine engine and is effective to translate movable cylinder 198 such that the pair of lands are in blocking engagement with fluid outlet conduits 197 and 203 when the variable elements of the gas turbine engine are in their scheduled position.

OPERATION OF THE INVENTION

The operation of the present invention will now be described in a first or normal mode of operation and then in a second or back-up mode of operation. Generally, in the normal mode, the back-up mechanical control 38 operates concurrently and compatibly with both the electronic fuel control computer 32 and the electronic variable geometry control computer 56 to regulate engine fuel flow and the position of the variable components of the gas turbine engine. More specifically, in the normal mode of operation, computer 32 assumes primary command in scheduling fuel to the gas turbine engine by providing electrical bias signal 36 to electro-hydromechanical servovalve 37 which in turn provides mechanical bias signal 39 to summer 48. Summer 48 subtracts bias signal 39 from mechanical output signal 46 generated by back-up control 38 and provides fuel metering signal 50 to fuel control valve 52. Upon failure of primary electronic fuel control computer 32, servovalve 37 drifts in a controlled manner in a direction which will cause an increase in fuel flow to the engine until the drift limit stop 142 is encountered whereupon flow of fuel to the gas turbine engine is scheduled solely by back-up control 38. Similarly, in the normal mode of operation, computer 56 assumes command in scheduling the position of the variable components of the gas turbine engine by providing electrical bias signal 57 to servovalve 55 which in turn provides mechanical bias signal 54 to summer 53. Summer 53 subtracts bias signal 54 from mechanical output signal 46 to provide variable geometry control signal 60 to control valve 61. With failure of computer 56, servovalve 55 drifts slowly in a direction which causes the variable components of the engine to change position to accommodate an increase in engine thrust or speed until drift limit stop 192 is encountered whereupon positioning of the variable component of the engine is accomplished solely by back-up control 38.

Referring to FIGS. 2 and 3, assume the engine is operating in a steady-state condition with primary computers 32 and 56 functioning properly. In the event the operator advances the power lever to call for increased engine thrust or speed, back-up control receives a change in input signal 40 ($\alpha$) and provides a change in mechanical output signal 46 in the form of initial leftward displacement of piston rod 103 in accordance with the description hereinbefore provided. The rate of change of signal 46 is rapid since the integrated control 30 is in a normal mode of operation and hence variable restrictor 114 is in an open position permitting substantially unrestricted flow of hydraulic fluid through return conduit 84. Hence, in the normal mode of operation back-up control 38 is not effective to limit the rate at which the fuel flow to the engine is increased upon acceleration of the engine.

Computers 32 and 56 receive a change in input signal 40 ($\alpha$) concurrently with the reception thereof by back-up control 38. Upon receipt of the change in signal 40 ($\alpha$), computer 32 which also receives engine operating parameters indicating the present speed of the engine, determines a schedule for increasing the fuel flow to the gas turbine engine at a rate whereby the engine may be accelerated to the new speed scheduled by the operator without encountering engine stall or overtemperature. Hence, the rate at which fuel flow is increased is limited by the primary electronic fuel control computer 32 in the normal mode of operation. Similarly computer 56 determines a schedule whereby the position of the variable stator vanes of the gas turbine engine may be changed to be compatible with the schedule for increasing fuel flow to the engine.

Initial leftward displacement of rod 103 is effective to begin rotation of pinion 146, through its engagement with rack 148, and hence to begin rotation of arms 144 and 196 in the clockwise direction (as viewed in FIG. 3). Initial rotation of arm 144 clockwise causes linkage member 134 of bias summer 48 to begin to rotate in the counterclockwise direction about upper pivot connection 136. In response to initial rotation of linkage member 134, shaft 147, which is affixed to linkage member 134, begins to translate to the right causing inner cylinder 156 to begin to translate to the right thereby increasing the overlap between windows 160 and 162 and permitting an increase in fuel flow to the gas turbine engine. Since back-up control 38 is ineffective to limit the rate of increase of fuel flow to the gas turbine engine upon acceleration in the normal mode, cylinder 156 will initially begin to translate rightward at a rate greater than the rate necessary to avoid engine stall or overtemperature. However, since computer 32 is receptive of the operating parameters of the gas turbine engine, computer 32 immediately senses that fuel is being increased to the engine at an excessive rate. Hence, computer 32 immediately provides a change in electrical bias signal 36 to insure that the rate of change of fuel flow to the engine is maintained at an acceptable rate. Bias signal 36 is received by electro-hydromechanical valve 37 which provides a change in mechanical bias signal 39 in the form of movement of piston 122 and rod 132 of power unit 124 to the right. Movement of rod 132 to the right causes linkage member 134 to rotate about intermediate pivot 138 in the clockwise direction. Such rotation of linkage member 134 pulls shaft 147 and inner cylinder 156 to the left, thereby reducing the area of overlap of windows 160 and 162 and reducing the rate of fuel flow to the gas turbine engine below the rate initially set by back-up control 38. Hence, computer 32 has primary command upon acceleration of the engine in the normal mode of operation because computer 32 provides a bias signal 36 which is adapted to suppress or override the increasing fuel flow rate required by back-up control 38.

As rod 103 of back-up control 38 continues to move to the left causing arm 144 to continue to rotate in the clockwise direction, computer 32 continues to provide changes in bias signal 36. Consequently, while rotation of arm 144 induces rotation of linkage member 134 counterclockwise about pivot 136, bias signal 36 effects rightward movement of piston 122 and rod 132 of power unit 124 thereby rotating linkage member 134 in the clockwise direction about pivot 138. Hence, rotation of a linkage member 134 about pivot 136 and pivot 138 occurs simultaneously with the net effect of such rotation being rightward movement of shaft 147 and inner cylinder 156 at a limited translation rate established by computer 32 as sufficient to avoid stall or overtemperature of the gas turbine engine. Since rotation of linkage member 134 in the counterclockwise direction about pivot point 136 increases fuel flow and rotation of linkage means 134 in the clockwise direction about pivot point 138 decreases fuel flow, simultaneous rotation to effect limited or controlled flow increase may be considered to be an algebraic summing of the motion of linkage member 134 induced by back-up control 38 and the motion induced by computer 32. Since the motion induced by bias signal 36 is in the direction decreasing fuel flow, it may be said to subtract from the motion induced by back-up control 38 or to negatively bias the motion induced by back-up control 38. Said another way, the bias signal 36 is effective to increase fuel flow to the engine at a lesser increasing rate than the increasing rate scheduled in accordance with back-up control 38.

Initial leftward displacement of rod 103 and rotation of pinion 146 is also effective to initiate rotation of arm 196 in the clockwise direction which in turn initiates rotation of linkage member 184 clockwise about pivot 190. In response to initial rotation of linkage member 184, shaft 194 and the pair of piston lands 200 are displaced to the right partially uncovering outlet conduits 197 and 203. Such displacement provides for fluid communication between fluid inlet conduit 207 and fluid outlet conduit 203 whereby fluid under pressure is admitted to the rod side 205 of power unit 201. In response to the fluid under pressure, piston 211 then begins to translate leftward in power unit 201 thereby modifying the position of the variable components (not shown) of the gas turbine engine. However, since back-up control 38 is ineffective to limit the rate of change of position of the variable components of the engine upon acceleration in the normal mode, piston 211 will initially translate leftward at a rate greater than the rate necessary to avoid engine stall. However, since computer 56 is receptive of the operating parameters of the gas turbine engine, computer 56 immediately senses that the position of the variable components is being modified at a rate not compatible with the engine including its acceleration schedule as determined by the fuel flow schedule set by computer 32. Hence, computer 56 immediately provides a change in electrical bias signal 57 to assure that the rate of change of position of the variable components is maintained at an acceptable rate. Bias signal 57 is received by electro-hydromechanical valve 55 which provides a change in mechanical bias signal 54 in the form of movement of piston 172 and rod 182 of power unit 170 to the right. Movement of rod 182 to the right causes linkage member 184 to rotate about pivot 186 in the counterclockwise direction. Such rotation of linkage member 184 pulls shaft 194 to the left thereby increasing the overlap of lands 200 and fluid outlets 197 and 203 and reducing the flow of fluid to the rod side 205 of power unit 201. Hence the rate of leftward displacement of piston 211 is reduced. In this manner then, the rate of change in position of the variable components upon acceleration of the engine in the normal mode of operation is controlled by computer 56 which provides bias signal 57 for modifying the position schedule of back-up control 38.

The operation of the present invention has heretofore been described with respect to operator demand for an increase in engine thrust or speed and hence acceleration of the engine. Upon operator demand for a decrease in engine thrust or speed, variable restrictor 114 is closed by solenoid 116 so as to cause all of the return flow of hydraulic fluid in conduit 84 to pass through variable restrictor 112. With variable restrictor 114 in the closed position, the rate of change of signal 46, that is translation of rod 103, is slow or limited. However, since the engine is being decelerated, stall and overtemperature are not a significant concern. Consequently, computer 32 provides a bias signal 36 which effects a reduction in fuel flow to the engine at a greater decreasing rate than the rate of decrease scheduled by back-up control 38. Hence, computer 32 controls engine deceleration in the normal mode by providing bias signal 36 which reduces fuel flow to the engine at a faster rate than the rate of reduction in fuel flow otherwise scheduled by back-up control 38. More specifically, upon a pilot demand for less thrust, a change in mechanical bias signal 39 is provided by servovalve 37, in response to electrical bias signal 36, in the form of rightward movement of piston 122 to the right causing linkage member 134 to rotate in the clockwise direction about pivot 138 to move shaft 147 and inner cylinder to the left and hence reducing the area overlap of windows 160 and 162. Contemporaneously arm 144 is rotated counterclockwise causing linkage member 134 to rotate counterclockwise about pivot 136. Since variable restrictor 114 is closed, arm 144 does not rotate linkage member 134 at a rate sufficient to achieve optimum deceleration of the gas turbine engine. However, computer 32 provides bias signal 36 which effects movement of piston 122 to cause additional rotation of member 134 whereby additional deceleration of the engine is achieved.

This aspect of the present invention should be particularly appreciated since in the normal mode of operation biasing of the back-up signal 46 by computer 32 is accomplished both upon acceleration and deceleration by movement of piston 122 in the same direction. That is to say, computer 32 always applies a bias signal which reduces fuel flow to the gas turbine engine. During the normal mode of operation computer 32 does not, at any time, provide a greater fuel flow than that required or set by back-up control 38. The feature of the invention is significant since it permits maximum limits in the form of stops 142 and 192 to be set proximate to and just above the fuel flow and variable component position appropriate in the normal mode of operation. More specifically, upon failure of the computer 32 the integrated control system may be permitted to drift in a controlled manner in a direction of increasing fuel flow and in a direction so as to reposition the variable components of the engine to accommodate a slightly increased speed or thrust. By utilizing a bias signal 36 in the normal mode which only reduces fuel flow, stop limit 142 may be provided to limit the increase of fuel flow in the event of failure of computer 32 to a small and acceptable amount. Hence upon failure of computer 32, there will be a slight increase in engine speed and thrust as a result of the slight increase in fuel flow as the engine is automatically transferred to command of back-up control 38.

Transfer to, and operation in, the back-up mode will now be specifically described. In the event of failure of computer 32, solenoid 116 is adapted, by means not shown, to close variable restrictor 114. Additionally, electro-hydromechanical servovalve 37 blocks hydraulic fluid under pressure from communication with both the head and rod side of piston 122. However, due to the presence of spring 120 and restrictor 130, piston 122 is driven slowly to the left. Leftward movement or drift of piston 122 will cause an increase in the fuel flow to the gas turbine engine. The fuel flow will be increased until rod 132 drifts into engagement with drift limit stop 142. Upon such engagement, fuel flow to the engine is under the sole command of back-up control 38. As previously indicated, the magnitude of the increase in fuel flow resulting from transfer from primary to back-up may be kept to a minimum by providing drift limit stop in close proximity to the location at which rod 132 might assume its most leftward position in the normal mode of operation.

During the back-up mode of operation with rod 132 in engagement with drift limit stop 142, back-up control 38 will provide for changes in fuel flow to the engine in response to changes in power lever position set by the operator. Since variable restrictor 114 is closed during operation in the back-up mode, all flow of hydraulic fluid in conduit 84 is caused to pass through variable restrictor 112 thereby limiting the rate of translation of rod 103 and hence limiting the rate at which fuel flow to the engine is changed as hereinbefore explained.

In the event of failure of computer 56, electro-hydromechanical servovalve 55 blocks hydraulic fluid under pressure from communicating with both the head and rod side of piston 172. However, due to the presence of spring 170 and restrictor 180, piston 172 is driven slowly to the left. Leftward movement or drift of piston 172 will cause the variable elements of the engine to reposition in a manner adapted to accommodate increased engine thrust. Repositioning will terminate when rod 182 drifts into engagement with drift limit stop 192. Upon such engagement position control of the variable elements of the gas turbine engine is under the sole command of back-up control 38. Hence, with computer 56 in a failed mode, back-up control 38 will provide for changes in position of the variable elements of the gas turbine engine in response to changes in power lever position set by the operator.

While the preferred embodiment of the present invention has been described and depicted, it will be appreciated by those skilled in the art that modifications, substitutions and changes may be made thereto without departing from the scope of the invention as set forth in the appended claims. By way of example, it is apparent that although computers 32 and 56 are shown separately herein they may be integrated into a single computer capable of performing the functions of both computers 32 and 56 on a time sharing basis.

What is claimed is:

1. An integrated control system for use with a gas turbine engine, said system comprising:
    a fuel control valve adapted to meter the flow of fuel to said gas turbine engine;
    back-up control means for providing a signal to said fuel control valve, said valve adapted to meter the flow of fuel to said engine in accordance with said signal;
    primary control means for providing a first bias signal useable in biasing said signal; and
    first biasing means for biasing said signal in accordance with said first bias signal during a first normal mode of operation wherein said primary control means are in an operative condition, said fuel control valve receiving said signal biased in accordance with said first bias signal.

2. The invention as set forth in claim 1 wherein said first biasing means is ineffective to bias said signal during a second failed mode of operation wherein said primary control means is in an inoperative condition.

3. The invention as set forth in claim 2 further including means for increasing the rate of flow of fuel to said engine in response to malfunction of said primary control means.

4. The invention as set forth in claim 3 further including limiting means for limiting to a predetermined magnitude said increase in said rate of fuel flow.

5. The invention as set forth in claim 1 further comprising:
    a variable geometry control valve adapted to control the position of a variable component of said engine in accordance with said signal;
    primary variable geometry control means for providing a second bias signal useable in biasing said signal;
    second biasing means for biasing said signal in accordance with said second bias signal when said variable geometry control means is in an operative condition said variable geometry control valve receiving said signal biased in accordance with said second bias signal.

6. The invention as set forth in claim 5 further including means for adjusting the position of said variable component in response to malfunction of said primary variable geometry control means.

7. An integrated control system for use with a gas turbine engine, said system comprising:
    a fuel control valve adapted to meter the flow of fuel to said gas turbine engine;
    back-up control means for providing a mechanical position signal, said fuel control valve adapted to receive said mechanical position signal and to meter the flow of fuel to said engine in accordance with said mechanical position signal;
    primary electronic control means adapted to provide an electrical bias signal useable in biasing said mechanical position signal, said fuel control valve adapted to receive said biased mechanical position signal and to meter the flow of fuel to said engine in accordance with said biased mechanical position signal.

8. The invention as set forth in claim 7 further including biasing means for biasing said mechanical position signal in accordance with said electrical bias signal during a first normal mode of operation wherein said primary electronic control means is in an operative condition.

9. The invention as set forth in claim 8 wherein said biasing means is ineffective to bias said mechanical signal during a second failed mode of operation wherein said primary electronic control means is malfunctioning.

10. The invention as set forth in claim 8 further including means for providing a mechanical bias signal in response to said electrical bias signal, said biasing means biasing said mechanical position signal in response to said mechanical bias signal.

11. The invention as set forth in claim 8 further including means for increasing the rate of flow of fuel to said engine in response to malfunction of said primary electronic control means.

12. The invention as set forth in claim 11 further comprising limiting means for limiting to a predetermined magnitude said increase in said rate of fuel flow.

13. The invention as set forth in claim 12 further including servomeans for providing a mechanical bias signal in response to said electrical bias signal, said biasing means biasing said mechanical position signal in response to said mechanical bias signal.

14. The invention as set forth in claim 13 wherein said means for increasing fuel flow is operatively connected to said servomeans.

15. The invention as set forth in claim 10 wherein said biasing means subtract said mechanical bias signal from said mechanical signal during said first normal mode of operation.

16. An integrated control system for use with a gas turbine engine, said system comprising:
    a fuel control valve adapted to meter the flow of fuel to said gas turbine engine;
    back-up control means for providing a signal to said fuel control valve, said valve adapted to meter the flow of fuel to said engine in accordance with said signal;
    primary control means for providing a first bias signal useable in biasing said signal, said first bias signal effective during acceleration of said engine to increase fuel flow to said engine at a lesser increasing rate than the increasing rate scheduled in accordance with said signal provided by said back-up control means.

17. The invention as set forth in claim 16 wherein said first bias signal is effective during deceleration of said engine to decrease fuel flow to said engine at a greater decreasing rate than the decreasing rate scheduled in accordance with said signal provided by said back-up control means.

* * * * *